US007747060B2

(12) United States Patent
Sadiq

(10) Patent No.: US 7,747,060 B2
(45) Date of Patent: Jun. 29, 2010

(54) CURRENCY EXAMINING SYSTEM

(76) Inventor: Masoom Sadiq, 7813 Choctaw Ct., Antelope, CA (US) 95843

( * ) Notice: Subject to any disclaimer, the term of this patent is extended or adjusted under 35 U.S.C. 154(b) by 944 days.

(21) Appl. No.: 11/536,406

(22) Filed: Sep. 28, 2006

(65) Prior Publication Data

US 2008/0080759 A1 Apr. 3, 2008

(51) Int. Cl.
*G06K 9/00* (2006.01)
*G07F 7/04* (2006.01)
*G09B 19/18* (2006.01)

(52) U.S. Cl. ........................ 382/135; 194/206; 434/110

(58) Field of Classification Search ................. 382/135, 382/136, 137, 138, 139; 209/534; 194/205, 194/206, 209–215; 902/15, 16, 7, 17, 28; 434/110; 235/17, 53, 437
See application file for complete search history.

(56) References Cited

U.S. PATENT DOCUMENTS

| | | | | |
|---|---|---|---|---|
| 3,187,891 | A | | 4/1963 | Chichester et al. |
| 3,220,549 | A | | 11/1965 | Wong |
| 3,618,765 | A | | 4/1969 | Cooper et al. |
| 4,187,463 | A | | 2/1980 | Kivenson |
| D283,803 | S | | 5/1986 | Zonn |
| 4,823,393 | A | * | 4/1989 | Kawakami .................. 382/135 |
| 5,484,994 | A | * | 1/1996 | Roustaei ................ 235/462.25 |
| 5,692,068 | A | * | 11/1997 | Bryenton et al. ............ 382/135 |
| 5,818,023 | A | * | 10/1998 | Meyerson et al. ........... 235/470 |
| 6,104,812 | A | * | 8/2000 | Koltai et al. .................. 380/51 |
| 6,714,288 | B2 | * | 3/2004 | Cohen ......................... 356/71 |
| 7,454,049 | B2 | * | 11/2008 | Paraskevakos .............. 382/135 |

* cited by examiner

*Primary Examiner*—Abolfazl Tabatabai
(74) *Attorney, Agent, or Firm*—Advantia Law Group; Michael W. Starkweather

(57) ABSTRACT

A currency examining system for detecting counterfeit currency. There is a magnifying device, substantially above the bill of currency being examined, configured to magnify the image of the currency; a transparent support member, substantially below the magnifying device, whereupon currency for examination may be placed; and a light unit, substantially below the transparent support member, configured to illuminate so as to show light through the transparent support member. Additionally there is a security mark index display, being configured to provide indicia of various security marks for determining authenticity of a bill of currency. The currency examining system also includes an adjustable frame member; a reflective member configured to reflect and direct light from the light unit generally towards the bill of currency being examined; and a control device in communication with the light unit, configured to control the intensity of light emitted from the light unit.

4 Claims, 3 Drawing Sheets

CURRENCY EXAMINING SYSTEM

BACKGROUND OF THE INVENTION

1. Field of the Invention

The present invention relates to examining systems, specifically for currency examining systems.

2. Description of the Related Art

In the related art, it has been known to use devices to distinguish between authentic and counterfeit paper currency. There are distinguishing features incumbent with authentic currency so as to provide an opportunity to distinguish authentic from counterfeit paper currency. There are people who endeavor to create counterfeit currency and try to use it as authentic currency. Such criminal behavior causes great financial damage to individual persons and well as the economy as a whole. There is a need for devices that accurately, quickly, easily and affordably distinguish the difference between authentic and counterfeit paper currency. Some improvements have been made in the field. Examples include but are not limited to the references described below, which references are incorporated by reference herein:

U.S. Pat. No. 5,692,068, issued to Bryenton et al., discloses a method and apparatus of reading bank notes is provided comprising storing signals in a memory. The imaging apparatus for scanning a stationary banknote includes a stationary light source, mirror, charge coupled device (CCD), and lens. The method corresponding to at least a portion of an array of pixels defined by a printed pattern on the face of a bank note, raster scanning the face of the bank note with a charge coupled device (CCD) to obtain a serial signal representing the pattern, searching the memory for the serial signal, comparing the serial signal with the stored signals, and indicating the correct presence of the bank note in the event the comparison correlates to a predetermined degree.

U.S. Pat. No. 3,618,765, issued to Cooper et al., discloses an apparatus to detect counterfeit U.S. paper currency in a manner which is simple, quick, and requires little or not skill. Almost all official U.S. paper currency does not exhibit a chromamorphic response other than that naturally attributable to the cotton or linen stock. Almost all counterfeit currency will exhibit a definite chromamorphic response in the blue range when activated by properly filtered ultraviolet light. Any suspected counterfeits are further subjected to a test for determining the magnetic characteristics of the ink. Genuine U.S. paper currency for the last 25 years uses black ink which incorporates a magnetic pigment.

U.S. Pat. No. 4,823,393, issued to Kawakami, discloses a bill discriminating device which is able to carry out a bill discriminating operation at high speed and precision based on a reduced amount of processing data for bill-type discrimination by extracting and reading only characteristic regions of the bill. According to the present invention, bill discrimination can be carried out by: reading the picture image data output from an image sensor; roughly discriminating the type of bill from the length of the picture image data (corresponding to the width of the bill); reading position data and reference patterns of the characteristic regions corresponding to the type of bill; extracting picture image data (a characteristic pattern) corresponding to the characteristic regions from the position data; and, finally discriminating the type of bill by comparing the characteristic patterns with the reference patterns.

U.S. Pat. No. 3,187,891, issued to Chichester et al., discloses a document handling device.

U.S. Pat. No. 3,220,529, issued to Wong, discloses method for discriminating between desired and undesired documents.

U.S. Pat. No. 4,187,463, issued to Kivenson, discloses a detector apparatus for counterfeit paper currency comprising a clamp and torsion pendulum assembly for holding a note to be tested, a moveable magnetic field source mounted so that it can be brought into contact with the note and then withdrawn, and indicating means for detecting and measuring deflection of the note.

U.S. Pat. No. 6,104,812, issued to Koltai et al., discloses an apparatus and process for hiding the secondary image within the primary image and generating a high quality hard copy of the unified elemental image of a variety of media. The process comprises the steps of rasterizing the first image into a first elemental image and rasterizing the second image, compensated with its own inverse, into an second elemental image. The first elemental image and the second elemental image are merged into a unified elemental image based on a predetermined decoding and compensating principle, resulting in the second elemental image being hidden within the first elemental image. An output image is created based on the unified elemental image where the primary image is visible to an un-aided eye while the secondary image is hidden from the un-aided eye.

U.S. Design Pat. No. 283,803, issued to Zonn, discloses the ornamental design for a counterfeit currency examining device.

The inventions heretofore known suffer from a number of disadvantages which may include being inconvenient, unduly complicated, limited accuracy, expensive and/or otherwise fail to provide an easy, portable and/or time efficient means to distinguish the authenticity of paper currency.

What is needed is a currency examining system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available currency examining systems. Accordingly, the present invention has been developed to provide a currency examining system for detecting counterfeit currency.

In one embodiment there is a currency examining system for detecting counterfeit currency. There may be a magnifying device, which may be disposed parallel to, and substantially above the portion of the bill of currency being examined, and configured to magnify the image of the currency; there may be a transparent support member, which may be oriented parallel to, and substantially below, the magnifying device, whereupon currency for examination may be placed, and may be composed of a transparent material; and/or a light unit, may be being disposed substantially below the transparent support member, and may be configured to illuminate so as to show light through the transparent support member.

The currency examining system may further include a security mark index display, which may be configured to provide indicia of various security marks for determining authenticity of a bill of currency. Additionally there may be an adjustable frame member which may be used to orient the components relative to each other. There may be a reflective member incorporated into the currency examining system, which may be disposed substantially near the light unit, configured to reflect and direct light from the light unit generally towards the bill of currency being examined. Furthermore, the currency examining system may include a control device incorporated therein, in communication with the light unit, and may be configured to control the intensity of light emitted from the light unit.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
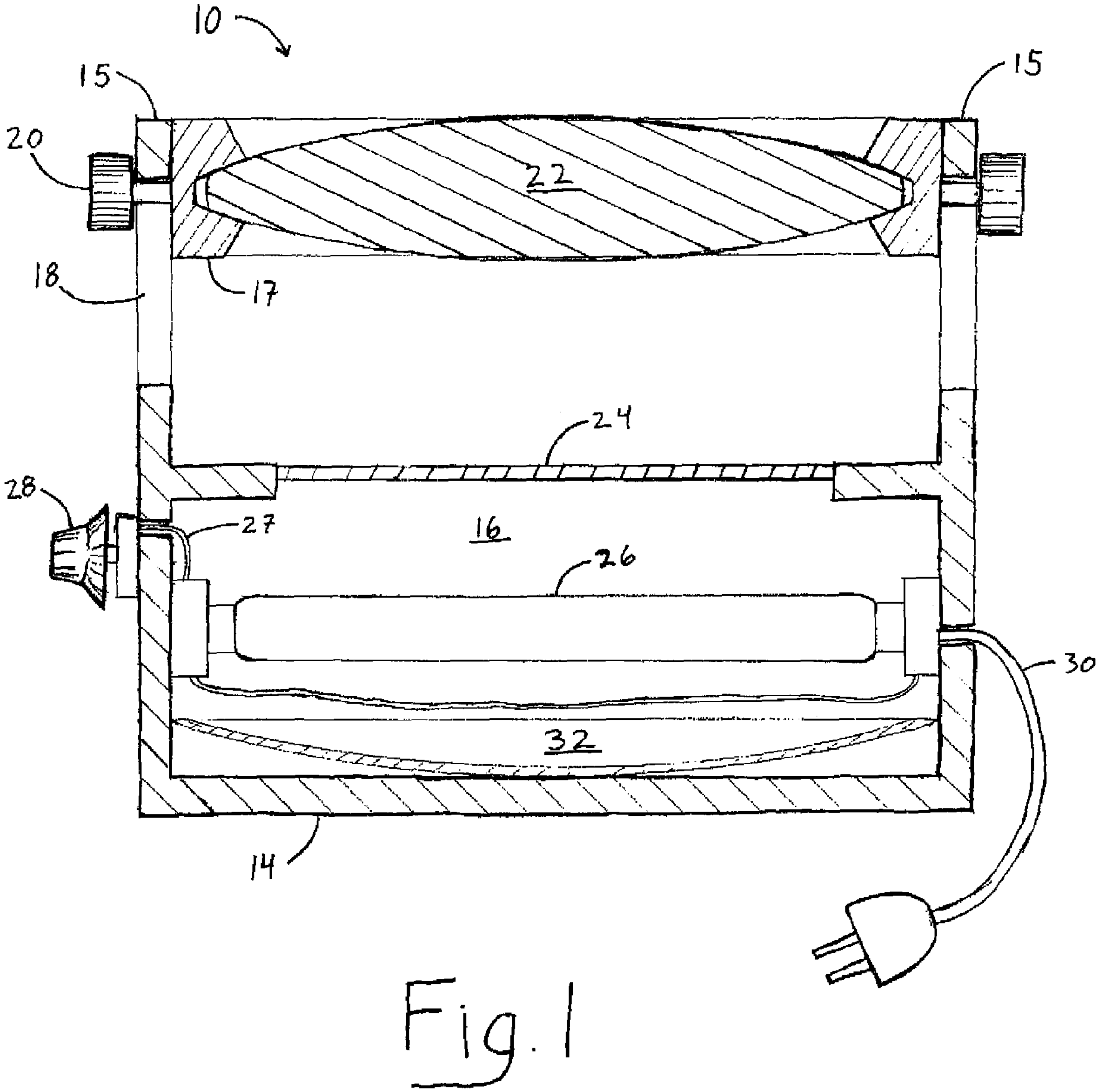
FIG. 1 illustrates a side cross-sectional view of a currency examining system, according to one embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a side cross-sectional view of a currency examining system 10, according to one embodiment. As shown the currency examining system 10 includes an adjustable frame 12 which serves as the structure wherein and whereupon the components of the system 10 are incorporated. In one embodiment, the adjustable frame 12 includes a frame body 14 and a translating member 17, which together provide the adjustable feature of the adjustable frame 12. In one embodiment, the frame body 14 is composed of rigid material so as to provide the structural integrity necessary to support the attachment of the various components of the currency examining system 10. As shown, the frame body 14 externally has a general rectangular shape. The frame body 14 substantially forms an enclosure portion 16 at the lower half thereof for containing components of the currency examining system 10. Above the enclosure portion 16 thereof the frame body 14 has walls 15 that are vertical and parallel to each other, with a substantial thickness, that rise to an elevation. In one embodiment, the walls 15 of the frame body 14 rise from the enclosure portion 16 to an elevation nearly equal to the depth of the enclosure portion 16 thereof.

In FIG. 1 the translating member 17 is shown disposed in between the two vertical upper walls 15 of the frame body 14. In one embodiment, the translating member 17 is adjustably coupled to the frame body 14. The translating member 17 is configured to translate vertically between two extremums. The lower and upper extremum are established by the length of guide slots 18 disposed in the frame body 14. The translating member 17 is configured to have posts thereon which fit through the guide slots 18. As shown there are two guide slots 18 disposed in vertical upper walls 15 of the frame body 14. To secure the translating member 17 in some vertical position along the path of the guide slots 18 there are adjustment nuts 20 disposed on the ends of the post portions thereof. The adjustment nuts 20 have a substantial cylindrical shape so as to be able to be grasped and rotated by a user. Further, the adjustment nuts 20 are formed so as to have a helical interior shape so as to be rotatable onto the post portion of the translating member 17 which also includes a complimentary helically formed shape. Such attachment of the adjustment nut 20 and the translating member 17 is like unto a bolt and nut.

As illustrated, the translating member 17 houses a magnifying device 22. The magnifying device 22 is fixably attached to the translating member 17, thus being able to translate up and down with the translating member 17. As shown, the magnifying device 22 is shaped like a magnifying glass lens. Such having a greater thickness at the central portion as compared to the outside portions thereof. Such shape operating to magnify the image of objects disposed on one side thereof.

Integrated into the frame body 14 is a transparent support member 24. As illustrated, there is a portion of the frame body 14, the top of the enclosure portion 16, that forms a horizontal surface wherein the transparent support member 24 is fixably attached. Such is oriented horizontal and disposed substantially central in the horizontal plane relative to the frame body 14. In one embodiment, the transparent support member 24 is composed of a rigid transparent material, like polycarbonate or glass.

In FIG. 1 a light unit 26 is shown disposed fixably attached to the vertical interior of enclosure portion 16 of the frame body 14. The light unit 26 is a fluorescent light tube connected at both ends to housing which includes circuitry within for distributing power to activate the light tube. The light unit 26 is in electrical communication by wire 27 with a control device 28 which is fixably attached to the exterior of the frame body 14. The control device 28 is disposed such that it is located centrally upon an exterior vertical face of the frame body 14. In one embodiment, the control device 28 includes a generally cylindrically shaped knob which is fixably attached to a post of a potentiometer disposed therein. The control device 28 is used to control whether power is distributed to the light unit 26 as well as the magnitude of power, thus controlling the intensity of the lights illumination. In FIG. 1, a power cord 30 is shown fixably attached to one end of the light unit 26. The power cord 30 provides for electric communication between the light unit 26 and an outside source of power such as a power outlet.

Further illustrated in FIG. 1 is a reflective unit 32, disposed within and fixably attached to the interior base of enclosure portion 16 of the frame body 14. In one embodiment, the reflective unit 32 is composed of rigid material which has reflective material on at least one side. Further, the reflective unit 32 is generally shaped to be concave so as to reflect light from the light unit 26 toward the transparent support member 24.

Figure 2:
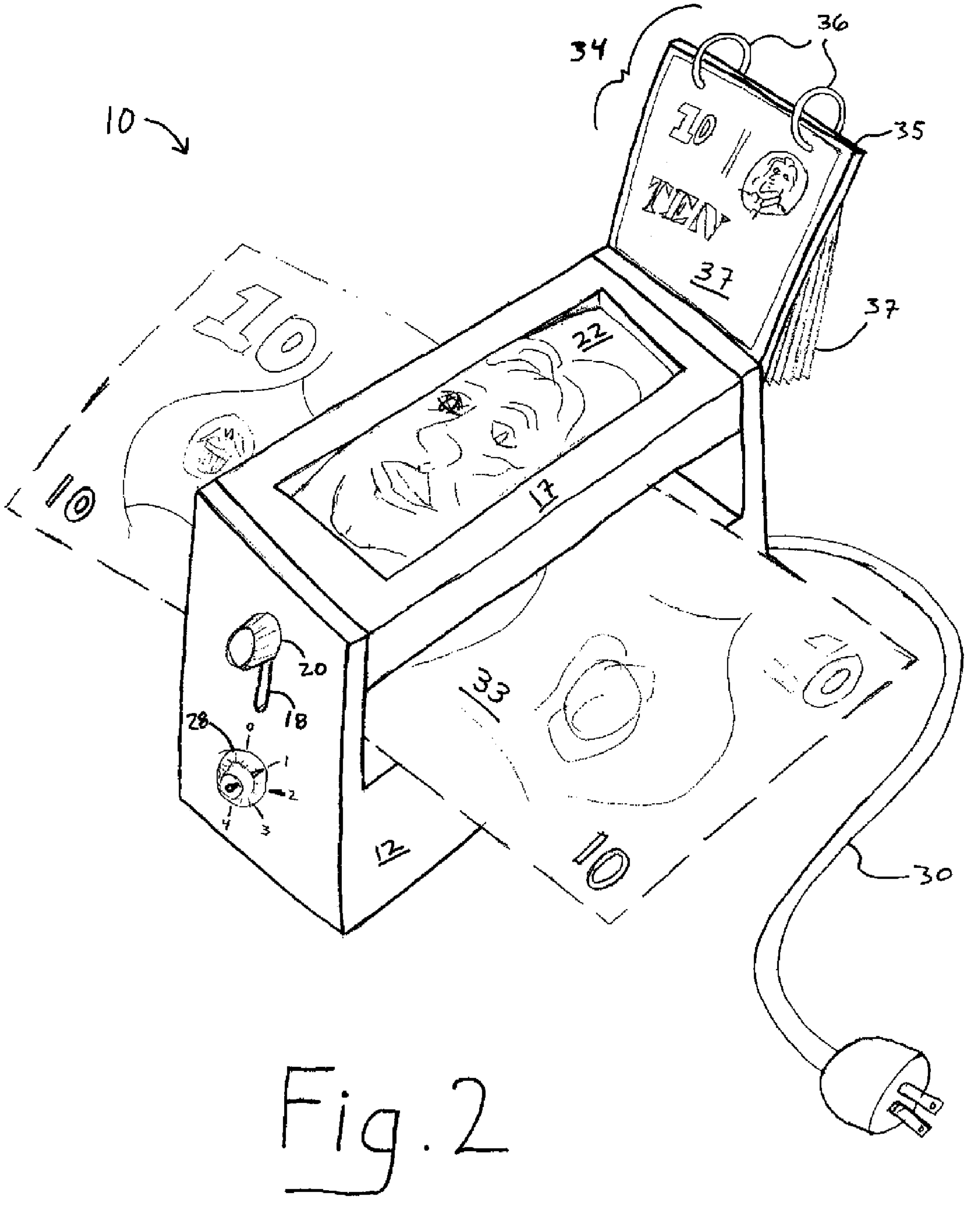
FIG. 2 illustrates a top perspective view of a currency examining system, according to one embodiment.

FIG. 2 illustrates a top perspective view of a currency examining system 10, according to one embodiment. There is shown a bill of currency 33 disposed within the adjustable frame 12 so as to be upon the transparent support member 24. For illustrative purposes of the operation of the currency examining system 10 an enlarged image of a portion of the bill of currency 33 is shown in the magnifying device 22. The bill of currency 33 may be transferred so as to pass through the system 10 such that any portion of the bill of currency 33 may be examined. Additionally, there is shown a security mark index display 34, disposed removably attached to a top edge of the adjustable frame 12. As shown, the security mark index display 34 includes a structural portion 35. Such structural portion 35 is fixably attached to the adjustable frame 12. The structural portion 35 also includes rings 36 removably attached thereto. The rings 36 hold a multiplicity of cards 37 thereto. Each of the cards 37 has information and images thereon which detail security marks for certain bills of currency.

In operation, a user may have a bill of currency for examination. A user may slide a bill of currency 33 into the adjustable frame 12 of the currency examining system 10, so that the bill of currency 33 is disposed substantially below the magnifying device 22, so as to be upon the transparent support member 24. A user may connect the power cord 30 to a power outlet. A user may rotate the knob of the control device 28 so as to allow power to be distributed to the light unit 26. A user may further adjust the light intensity output from the light unit 26 by use of the control device 28.

A user may adjust the elevation of the magnifying device 22 to obtain a desirable magnification of the image of the bill of currency 33. To adjust the elevation of the magnifying device 22 a user may rotate each adjustment nut 20 to a loosened state so as to allow the translating member 17 to slide to a different elevation within the limits of the guide slots 18. Upon positioning the translating member 17 to a desirable elevation a user may rotate each adjustment nut 20 to a tightened position so as to secure the translating member 17.

Figure 3:
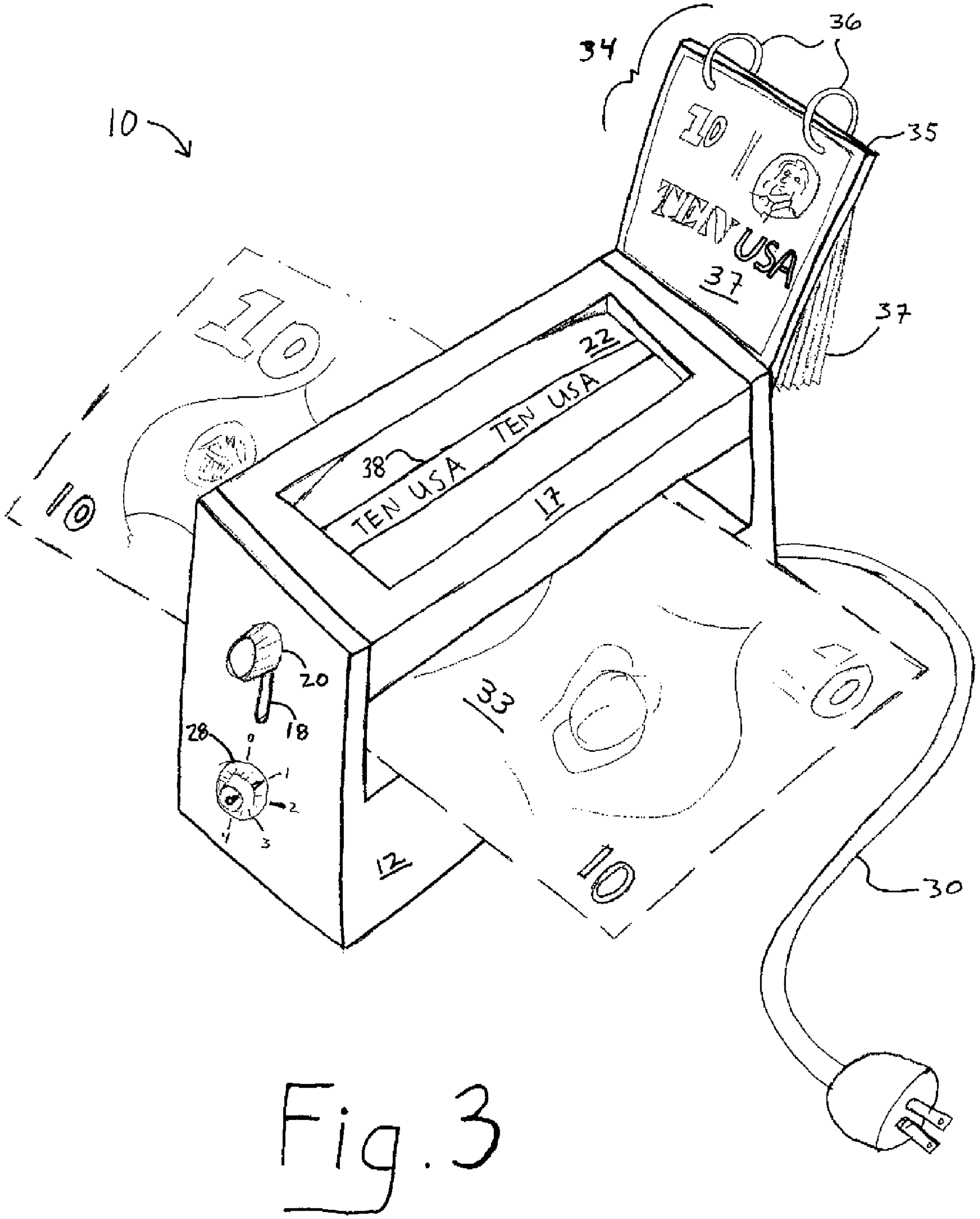
FIG. 3 illustrates a top perspective view of a currency examining system, according to one embodiment.

Further, in operation a user may select the appropriate security mark information in the security mark index display 34, for the particular bill of currency 33 being examined. The user may move the bill of currency 33 within the currency examining system 10 so as to see the specific portion of the bill of currency 33 where the particular security marks are to be located. In one embodiment, the system 10 enables the user to see invisible pictures located on the right side of the bill of currency 33 valued at ten dollars, twenty dollars, fifty dollars, and/or one hundred dollars. Further, as shown in FIG. 3, one embodiment of the system 10 allows the user to view an invisible strip 38 disposed on the United States Bills of Currency 33 through the magnifying device 22. Non-limiting examples of such bills of currency may include ten dollar bills, twenty dollar bills, fifty dollar bills, and/or on-hundred dollar bills.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the currency examining system is illustrated in the figures as a connected system, it is envisioned that any and or all of the components may be separated structurally while maintaining any electrical communications necessary for operation of the present invention. Additionally it is envisioned that the size of the system and the various components may vary according to what may be desired.

Additionally, although the figures illustrate that the magnification device is a simple magnifying lens coupled to the adjustable frame it is envisioned that multiple magnifying lens may be used and/or various interchangeable magnifying devices may be used with the system to obtain the desirable magnifying effect. Further, FIG. 1 illustrates a fluorescent light unit, it is envisioned that many other types of light units may be implemented to fulfill the intended function of the present invention. For example, an incandescent, LED, neon, and/or halogen light unit may be used in the system.

It is also envisioned that the power for the system may alternatively be obtained from a DC power source such as a battery. Such battery may be disposed internal or external to the adjustable frame of the system. It is envisioned that the adjustment nuts may be of other fixture types that fulfill the same function, such as a wing nut. Although the security mark index display shown in FIG. 2 is a book type index of information detailing security marks in various currencies, it is envisioned that an electronic display device having a data base of such information may also be used. Such an electronic index of security marks may be stored in and displayed on any of the various Personal Digital Assistants, PDA's, which may be available on the market.

Finally, it is envisioned that the components of the device may be constructed of a variety of materials. Each component may be composed of one or more of the following materials; metals such as aluminum alloys, steel alloys, and/or titanium alloys, plastics such as polycarbonate, polyvinylchloride, polypropylene, polyethylene, polystyrene, polyethylene-triethylene and/or a polyolefin, and/or a ceramic such as glass and/or silicone composite material.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A currency examining system that enhances the ability of human judgment to discern the vagaries of counterfeit currency, comprising:

- a base member;
- a magnifying device, coupled to the base member, being disposed parallel to and above a portion of the base member, to enable examination of a bill of currency, and configured to magnify the image of the bill of currency;
- a transparent support member, coupled to the base member, being oriented parallel to and below the magnifying device, whereupon the bill of currency for examination is placed thereon, and being composed of a transparent material;
- a light unit, coupled to the base member, being disposed below the transparent support member, and configured to illuminate so as to show light through the transparent support member; and
- a security mark index display, coupled to the base member, and positioned to allow for simultaneous viewing by a user with the magnifying device as it magnifies the bill of currency, the security mark index display having:
  - a first reference guide for a first currency, indicating at least a first key counterfeit identification feature located on the bill of currency that is identifiable through the magnifying device; and
  - a second reference guide for a different bill of currency, indicating at least a first key counterfeit identification feature located on the different bill of currency that is identifiable through the magnifying device.

2. The currency examining system of claim 1, further comprising an adjustable frame member configured to orient the components relative to each other.

3. The currency examining system of claim 1, further comprising a reflective member, being disposed substantially near the light unit, and configured to reflect and direct light from the light unit generally towards the bill of currency being examined.

4. The currency examining system of claim 1, further comprising a control device, being in communication with the light unit, and being configured to control the intensity of light emitted from the light unit;

- wherein the different intensities of light will better illuminate the various features of the bill of currency in question.

* * * * *